United States Patent [19]

Shinohara et al.

[11] 3,862,094

[45] Jan. 21, 1975

[54] ELECTROCONDUCTIVE HIGH POLYMER COMPOSITION

[75] Inventors: Isao Shinohara; Eishun Tsuchida; Katsuhiro Mizoguchi, all of Tokyo, Japan

[73] Assignee: Nippon Electric Company Limited, Tokyo-to, Japan

[22] Filed: Aug. 24, 1972

[21] Appl. No.: 283,420

[30] Foreign Application Priority Data

Aug. 24, 1971 Japan................................ 46-64006

[52] U.S. Cl............. 260/78.4 N, 252/500, 260/2 R, 260/79, 260/80 P
[51] Int. Cl...... C08f 7/00, C08f 27/08, C08g 33/02
[58] Field of Search.......... 260/78.4 R, 78.4 N, 2 R; 252/500

[56] References Cited
UNITED STATES PATENTS

| | | | |
|---|---|---|---|
| 3,346,444 | 10/1967 | Lupinski et al..................... | 161/213 |
| 3,448,177 | 6/1969 | Goodings et al................... | 260/895 |
| 3,632,526 | 1/1972 | Yamamoto et al................. | 252/500 |

*Primary Examiner*—Joseph L. Schofer
*Assistant Examiner*—John Kight

[57] ABSTRACT

A high polymer composition comprising a salt constituted from an integral type of polycationic polymer containing in its principal repeating unit a quarternarized nitrogen atom, which is a member of a saturated heterocyclic ring acting as a side chain, and a linking unit in its principal chain, an anion radical of a tetracyano compound and a neutral tetracyano compound in appropriate amounts such that the electroconductivity is greater than $10^{-7} v\, cm^{-1}$. For practical uses it has very excellent chemical, physical and electrical porperties.

11 Claims, No Drawings

ELECTROCONDUCTIVE HIGH POLYMER COMPOSITION

BACKGROUND OF THE INVENTION

1. Field of the Invention

The present invention relates to an electroconductive high polymer composition.

More particularly, the present invention relates to an electroconductive high polymer material, and in particular to a complex polyion composition prepared by using a polycationic high polymer as a matrix for the formation of simple salts within said polycationic polymer. In the preparation, a radical anionic compound possessing a structure capable of imparting an electroconductivity to said polycationic high polymer, such as the radical anion of 7,7',8,8'-tetracyanoquinodimethane, combines with the cationic sites within the polymer. A neutral tetracyano compound, such as 7,7',8,8'-tetracyanoquinodimethane (hereinafter to be abbreviated as TCNQ), is added to the polymer and units with the ionic moieties to form complex salts. Furthermore, the present invention relates to a process for preparing said complex polycationic electroconductive polymer.

2. Description of the Prior Art

As is well known, in general almost all high polymer materials are good electric insulators. Recent progress within the electronics industry has lead to the need for electroconductive high polymer materials easy to process and having electroconductivities of the same order as inorganic semiconductor materials. Thus, the development of electroconductive high polymer materials has been greatly accelerated. Conventional electroconductive high polymer materials include (1) ion-conductive high polymer materials such as those found among high polymer electrolytes, and (2) electron-conductive high polymer materials having conjugated double bonds of $\pi$-electrons, such as polyacetylene or graphite. Ion-conductive high polymer materials, however, have an electroconductivity of the order of $10^{-8}$ mho/cm at most, which is far lower than that of inorganic semi-conductors. Furthermore, the corrosion of electrodes or the consumption of ionic groups due to electrolytic phenomena results in the deterioration of materials employed so as to render the practical use of ion-conductive high polymer materials in electronic materials of high reliability inadvisable. As is well known, electron-conductive high polymer materials include (1) linear and planar $\pi$-electron conjugated high polymer compounds such as polyenes, polyines, polyphenylene, graphite, etc.; (2) high polymer chelate compounds such as poly-Cu-phthalocyanine, and (3) charge-transfer type high polymer compounds such as polyvinyl carbazole-iodine, etc. There are, particularly, among linear or planar conjugated systems or high polymer chelates, compounds that have an electroconductivity as high as that of inorganic semiconductors. These compounds are much less easy to process, insoluble in almost every solvent, and possess no heat-softening properties. Thus, these compounds at least can only be used in powder form such as a carbon-powder, and have a limited range of practical use. In an effort to find electroconductive high polymer materials which are easily made into films and easy to process, attention has been focused upon complex charge-transfer polymer materials comprising various kinds of donor and acceptor species. However, these materials have no serviceable electroconductivity for practical use. Particularly, in complex charge-transfer polymer materials, bonds between donor molecules and acceptor molecules depend only upon complex charge-transfer type bonds resulting in high potential barriers to the flow of electrons, making it difficult to increase the level of electroconductivity.

In contrast to these materials, a complex of a polycationic copolymer and the 7,7',8,8'-tetracyanoquinodimethane radical, as described in Japanese Patent Publication Gazette No. 15870/1969, is recognized as being easily processed and as having a high electroconductivity. However, it is not serviceable practically because of its low measurement reproducibility and its low stability.

SUMMARY OF THE INVENTION

Accordingly, it is one object of the present invention to provide an electroconductive high polymer composition which does not have the aforementioned difficulties and, for practical applications, has excellent chemical, physical and electrical properties.

It is another object of the invention to provide an economically advantageous process for preparing useful electroconductive high polymer compositions.

These and other objects, as will hereinafter become more readily apparent, have been attained by the provision of an electroconductive high polymer composition which is formed from an integral type polycationic polymer salt containing in its principal repeating unit a quarternarized nitrogen atom, which is a member of a saturated heterocyclic ring acting as a side chain, and a linking unit, an anion radical of a tetracyano compound, and a sufficient amount of a neutral tetracyano compound to impart a degree of electroconductivity to said salt greater than $10^{-7} \mho\,cm^{-1}$. These types of complex salts are prepared by reacting an integral type polycationic polymer containing repeating units consisting of a quarternarized nitrogen atom, which is a member of a heterocyclic ring acting as a side chain, and a linking unit, with a metallic salt or an organic cation salt of a tetracyano anion radical in a liquid phase under an atmosphere of nitrogen. Thus, a complex polycationic polymer containing a tetracyano anion radical is obtained by adding a neutral tetracyano compound in solution to the complex. The electroconductive high polymer compositions of the present invention achieved by structural considerations concerning $\pi$-electron conduction, display an extremely excellent effect.

DETAILED DESCRIPTION OF THE PREFERRED EMBODIMENTS

By considering the mechanism of electroconduction due to non-localized $\pi$-electrons it has been possible to divide the structure of the complex functionally, into a matrix portion and a portion in which conduction electrons are active. That is, in the composition of the present invention, the cationic polymer portion can be considered to be a matrix of a complex which functions to maintain a conjugated system, but which also determines the degree of heat resistance and processability of the system.

In molecular design trails on the structure of macromolecular polyion complexes, it has been found that the reaction of a low molecular weight radical anion with a polycationic polymer will result in the formation of a complex of salt type bonds. That portion of the structure which contributes to electroconduction is designated as TCNQ in a combination with the polycationic high polymer and a TCNQ radical anion. Doping is considered to be necessary in order to completely establish a conjugated system in the complex. The particular structure and arrangement of the conjugated system has extreme importance so far as electroconductivity is concerned. In fact, various polycations having pendant type structures or integral type structures possess widely varying properties. If the compound has almost no regular space arrangement, it will possess almost no electroconductivity. It has now been found that an integral type of polycationic polymer having a principal chain represented by the formula:

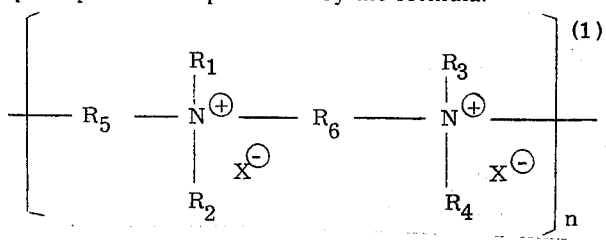

is effective. In particular, a polycationic polymer having a chain comprising a cyclic amine and a xylylene group as shown by the formula:

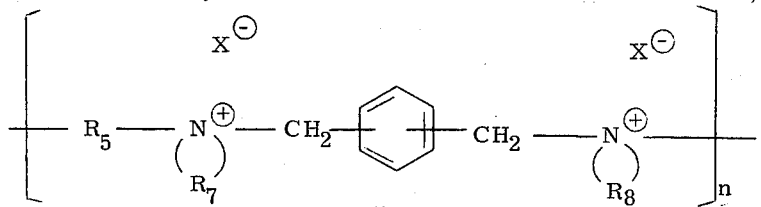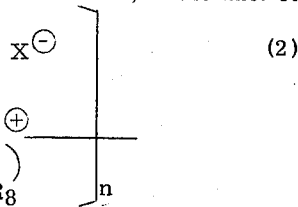

is most effective.

In formulas (1) and (2) above, $R_1$, $R_2$, $R_3$ and $R_4$ are alkyl groups having 1 to 4 carbon atoms, and may be the same or different; $R_5$ and $R_6$ represent saturated or unsaturated alkylene, aryl alkylene or xylylene groups; $R_7$ and $R_8$ are selected from saturated alkylene groups having 3 to 30 carbon atoms and one or more oxygen, nitrogen or sulfur atoms in addition to the carbon atoms; $X^-$ is a counter ion to the ammonium group.

For comparison purposes, reference is made to a polycationic polymer described in Japanese Patent Publication Gazette No. 15870/1969. The polycation polymer described in that publication has either a pyridine group or a phenyl group pendant on a repeating methylene chain. The nitrogen atoms are quarternarized. The complexes described in that publication have a maximum electroconductivity of $10^{-3}$ mho/cm. However, the reproducibility of the electroconductivity of the example was poor, its heat-stability was low, and it easily deteriorated. In contrast, the polycationic polymers of the present invention differ both in preparation and in composition, and the products possess far superior chemical, physical and electrical properties. The polycationic polymers of the present invention are of an integral (or laminate) type having a quarternarized nitrogen cation group in the principal high molecular weight chain. Whereas the pendant type of polymers of the above indicated prior art are prepared by polymerizing vinyl type monomers and carrying out the quarternarization reaction on the resulting polymer with the aid of quarternarizing agents, or by synthesizing a quarternarized monomer by an extremely difficult process and then polymerizing the monomer, the integral type of polycation polymer of the present invention is advantageously and very economically prepared by quarternarization of the nitrogen atoms and simultaneously performing a polyaddition in a one step process. The particular composition is almost arbitrary. In other words, the integral type polycationic complexes differ from the pendant type TCNQ salts in that they have a polycationic polymer matrix which possess a quarternarized nitrogen cation group in its principal high polymer chain. This permits the anion radical such as a TCNQ anion radical to contribute to the electroconductivity, by being systematically and closely arranged by chemical bonds. This makes it easy to introduce a tetracyano compound, such as neutral TCNQ, spatially so that the integral type of polycationic complex will display such excellent characteristics as an electroconductivity which is comparatively better by an order of about 3 to 4, a thermal variation in electroconductivity which is more stable by a factor of about 1.2 to 2 and a heat resistance which is higher by a factor of about 1.5. The pendant type TCNQ salts, on the other hand, are irregularly bonded and so are poorer in electroconductive properties, heat sensitivity and heat resistance.

The composition of the present invention possesses good solubility in various solvents. For instance, it has at least 20 percent by weight solubility in solvents such as dimethylformamide, dimethylacetoamide, dimethylsulfoxide, or the like. The composition of the present invention possesses excellent flexibility and films prepared by vaporizing the solvent from a dimethylformamide solution thereof are extremely stable within the temperature range of $-30°$ to $250°C$. They are mechanically strong and paramountly easy to process and thus have a far wider range of potential application. The material of the present invention is very low in hygroscopicity owing to its rigid bond structure between the polycationic polymer and the anion radical, and it suffers almost no change in electrical characteristics even after being allowed to stand for 1,000 hours in a humidity of 67 percent.

As described above, an electroconductive high polymer composition of an integral type of polycationic polymer has many excellent advantages over a pendant type polymer.

In particular, the electroconductivity and workability can be greatly improved in the case of an integral type of polycationic polymer, by the polymerization of a cyclic amine and a linking group such as a xylylene group to form a principal chain containing quarternarized nitrogen atoms. These materials can exhibit various characteristic properties depending upon the structure of the heterocyclic ring containing the quarternarized amine. For instance, in the case of a heterocyclic ring which contains only nitrogen atoms, the electroconductivity increases to about $10^{-4} \, \mho \, cm^{-1}$ upon the addition of a neutral tetracyano compound to the polycationic polymer containing associated tetracyano radical anions. In contrast, the polycationic polymer containing only associated tetracyano radical anions possess an electroconductivity about $10^{-9} \, \mho \, cm^{-1}$. In the instances where the heterocyclic rings are composed of hetero atoms in addition to a nitrogen atom which have higher electronegativities such as oxygen, sulfur, and the like, a polycationic polymer containing an associated tetracyano radical anion can exhibit electroconductivities as high as $10^{-3} \mho cm^{-1}$, even though a neutral tetracyano compound has not been added. Upon the addition of a neutral tetracyano compound thereto, electron conductivities as high as $10^{-2} \mho cm^{-1}$ are observed.

The high electroconductivities of these materials, which do not contain associated neutral tetracyano radicals, is a characteristic found only in these materials. Furthermore, these materials have been found to possess extraordinarily high dielectric constants reaching an order of magnitude of several thousands. In fact, a salt comprising a polycationic polymer synthesized from $\alpha, \omega$-dimorpholino paraxylene and p-xylene dichloride and associated tetracyanoquinodimethane anion radicals exhibited a dielectric constant of almost 8,000 at a measured frequency of 1 $KH_z$. As a result of various investigations conducted to determine the cause of the greater electroconductivities exhibited by the polycationic polymers containing heterocyclic rings having highly electronegative hetero atoms such as oxygen, sulfur, and the like, it has been found that the cationic characteristic of the quarternarized nitrogen atoms is enhanced by the electron attracting ability of these atoms. Thus, the associated tetracyano radical anions are strongly attracted to the cationic sites and are more densely arranged around these sites. The anions are repelled by the electronegative hetero atoms in the heterocyclic rings and are forced into a regular arrangement. Thus, the anions are maintained in a certain direction, resulting in electroconductivities sufficiently high so as to preclude the need for an additional neutral tetracyano compound. As a consequence of the specific alignment of the anions within the polymer matrix, polarization of the anions is greatly increased. Very large dielectric constants are also observed.

It has been found that those polycationic polymers which contain xylylene linking groups have greater electroconductivities by an order of 2 to 3 and several times better thermal stabilities in comparison to those polymers which contain methylene linking groups. Another remarkable characteristic of those polymers containing xylylene linking groups derived from highly reactive xylylene dihalide monomers such as p-xylylene dichloride and the like, is that polymers having comparatively large molecular weights can be produced, which have excellent film-formation ability and workability. The introduction of xylylene groups in the polymers can improve the solubility of these materials resulting in a broadened application range for these materials. Thus, the compositions of the present invention exhibit excellent workability and electroconductivity by the synergistic action of the cyclic amine and xylylene groups. The most stable and readily available tetracyano radical anions useful in the present invention include the 7,7,7,8-tetracyanoquinodimethane radical anion and other tetracyano radical anions having a great electron-affinity such as the tetracyano-ethylene radical anion, the 1,2,4,5-tetracyano-quinone radical anion, the 1,2,4,5-tetracyanothio-quinone radical anion and the like. These radical anions are practically used as metallic salts of lithium, sodium, potassium, copper, iron, cesium, or the like or as organic cation salts of various amines or the like. In general, these radical anion salts are easily soluble in a solvent such as alcohol, water, and the like. The lithium salt of TCNQ is among those salts which are the most stable, readily available and easiest to use.

The salt produced by reacting a polycationic polymer having within its principal repeating unit a quarternarized nitrogen atom which is a member of a saturated heterocyclic ring and a xylylene linking group as shown in general formula (2) with a tetracyano radical anion such as tetracyanoquinodimethane radical anion, and the like, is a good semi-conductor. Simple polycationic salts of this type, however, do not have a sufficient electroconductivity. Addition of a neutral tetracyano compound thereto results in materials having sufficient electroconductivities of up to $10^{-4} \mho cm^{-1}$ or more. Consequently, the materials of the present invention comprise polycationic polymers which are associated with a tetracyano radical anion and a neutral tetracyano compound. In this invention, the neutral tetracyano compound added to the polycationic polymer may be the same compound used as the associated tetracyano radical anion or any other tetracyano compound.

In the following description of a process for preparing the compositions of the present invention, the lithium salt of TCNQ is used as the tetracyano radical anion salt. The present invention, however, is not limited to the use of the lithium salt of TCNQ.

The polycationic polymers of the present invention are easily soluble in solvents such as water and alcohols such as methanol and ethanol. Thus, a proper amount of a polycationic polymer is completely dissolved in any one of the solvents or in a mixture of the solvents and is added to an alcoholic solution of the lithium salt of TCNQ with vigorous stirring under an atmosphere of nitrogen. The resulting polycationic polymer-TCNQ salt separates as a green or black precipitate, while the lithium halogenide produced remains dissolved in solution. Thus, separation of the products of the reaction is easy. The reaction temperature and reaction time may be varied depending on the kinds and concentrations of materials used. As a result of several experiments, the most favorable results are obtained at reaction temperatures in the range of 0° to 50°C. and for reaction times of 30 minutes to 5 hours. As is well known, tetracyano radical anions are readily oxidized by oxygen. Therefore, in order to avoid the loss of materials due to side reactions, all solvents are sufficiently degassed and exposed to nitrogen gas before use. All reactions are conducted under an atmosphere of nitrogen. When the lithium salt of TCNQ is used in amounts in excess of 1 to 2 times the stoichiometric amount of halide ion, the exchange rate of halogen ions to TCNQ radical anions is increased and a yield of more than 90 percent can be obtained in most cases. The results of the chemical analyses of the products obtained confirms that the desired products are obtained and the counter ions of the quarternarized nitrogen cationic groups have been substituted with TCNQ radical anions. Although the polycationic polymer-TCNQ salt thus obtained shows a sufficient electron conductivity in itself, it has been found that the addition of a sufficient amount of neutral TCNQ produces a $\pi$-electron conductive polycationic polymer-TCNQ complex salt having an extremely high electroconductivity above $10^{-5}$ mho/cm. Addition of neutral TCNQ to the polymer can be performed by mixing the reactants with or without the presence of a solvent. Experiments have revealed that mixing of the reactants without the presence of a solvent does not lead to the formation of a complete complex of both materials, and gives a product having inferior measurement reproducibility. The presence of solvent, however, gives a product possessing good and stable measurement reproducibility. The polyion complexes of the present invention have an excellent solubility in many solvents. For example, solubilities of at least 20 percent by weight, in solvents such as N,N'-dimethylformamide,N,N'-dimethylacetoamide,N,N'-dimethylsulfoxide,N-methyl-2-pyrrolidone and the like are achieved.

In preparing film, one of these solvents may be used to completely dissolve the appropriate polycationic polymer-TCNQ simple salt and an appropriate amount of neutral TCNQ. The resulting solution is then poured over a base plate, such as a plastic or glass plate, and the solvent is evaporated under a sufficiently reduced pressure.

As a result of various measurements using films formed in that manner, it has been found that they possess a high electroconductivity of $10^{-5}$ mho/cm or more, the frequency characteristics of electroconductivity is completely stable up to at least 10 KC, and the thermal variation in electroconductivity is very small and stable. The polycationic polymer-TCNQ complex salt containing neutral TCNQ may be used as is, or may be used as a blend, or as a combination with any other highly resistive polymer, if necessary.

Having now generally described the invention, a further understanding can be attained by reference to the following Examples which are provided herein for purposes of illustration only and are not intended to be limiting in any manner unless otherwise herein specified.

All solvents used in the following Examples were previously degassed by boiling under reflux for 5 hours and exposed to nitrogen gas to minimize the reaction of TCNQ radical anion with oxygen.

EXAMPLE 1

A 9.8 g quantity of a polycationic polymer produced by the nitrogen quaternarization reaction of α,ω-dipiperidino-p-xylene and p-xylene dichloride was completely dissolved in 1.25 l. of a mixed solvent of water and methanol in a ratio of 1:1. This solution was treated with 5.0 g of the lithium salt of TCNQ dissolved in 1.25 l. of the same mixed solvent. The reaction was run under an atmosphere of nitrogen at 30°C. for 2 hours. Immediately after the reaction commenced, the product began to precipitate as a dark blue material. After the reaction was completed, the precipitate was separated by filtration and, after sufficient washing with separate quantities of water and methanol, was sufficiently dried. A reaction product was obtained in a yield of 9.5 g.

Chemical analyses of the reaction product confirmed that the halogen ions were almost completely exchanged with TCNQ radical anions and the desired product was obtained.

Next, the polycationic polymer-TCNQ simple salt was dissolved in N,N'-dimethylsulfoxide and a solution of N,N'-dimethylsulfoxide containing an appropriate amount of neutral TCNQ was added thereto and sufficiently stirred. When the resulting solution was poured over a glass plate and the solvents sufficiently vaporized under reduced pressure, a glossy black film of improved adhesion was obtained. The electroconductivity of the film so obtained was measured and the relationship to the amount of neutral TCNQ added is shown in Table I.

Table I

| Amount of neutral TCNQ added, neutral TCNQ/anion TCNQ (mole ratio) | ρ (specific resistivity) Ω·cm |
| --- | --- |
| 0 | $2.5 \times 10^9$ |
| 0.1 | $3.1 \times 10^7$ |
| 0.2 | $1.8 \times 10^6$ |
| 0.3 | $1.5 \times 10^5$ |
| 0.4 | $6.2 \times 10^4$ |
| 0.5 | $1.4 \times 10^5$ |

The film showed the lowest resistance value of $6.2 \times 10^4$ Ω.cm when the ratio of neutral TCNQ to anion TCNQ was 0.4. Furthermore, thermal analysis studies revealed that this material was stable up to at least 200°C., and even though it was allowed to stand at 80°C. for 2,000 hours, it electrical properties remained unchanged and its stability was excellent.

EXAMPLE 2

A 5.0 g quantity of polycationic polymer produced by the nitrogen quaternarization reaction of α,ω-dipiperidino propane and p-xylylene dichloro was dissolved in 500 ml. of a methanol-water (3:1) mixed solvent, and was reacted with 5.8 g of the lithium salt of TCNQ dissolved in 500 ml. of the same mixed solvent. This reaction was conducted under an atmosphere of nitrogen at 30°C. for 3 hours. Immediately after the reaction commenced, the product began to precipitate as a dark blue material.

After the reaction was completed, this precipitate was separated by filtration, repeatedly washed with water and methanol, and sufficiently dried. An 8.5 g quantity of the reaction product was obtained. Chemical analyses of the reaction product confirmed that the halogen anions were almost completely exchanged with TCNQ radical anions and the desired product was obtained.

A film was prepared of the product in the same manner as set forth in Example 1 and electroconductivity measurements were conducted.

The specific resistivity relationship corresponding to the amounts of neutral TCNQ added are shown in Table II.

TABLE II

| Amount of neutral TCNQ added, neutral TCNQ/anion TCNQ (mole ratio) | ρ (specific resistivity) Ω·cm |
| --- | --- |
| 0 | $1.8 \times 10^{10}$ |
| 0.3 | $1.0 \times 10^6$ |
| 0.5 | $3.9 \times 10^3$ |

This material had a good solubility. Thus, 160 mg. of the polycationic polymer-TCNQ simple salt were readily dissolved in 1 ml. of N,N'-dimethylformamide. Films formed from solution thereof possessed excellent adhesive characteristics.

EXAMPLE 3

A 10.3 g quantity of a polycationic polymer produced by the nitrogen quaternarization reaction of α,ω-dimorpholino-p-xylene and p-xylylene dichloride was completely dissolved in 500 ml. of a methanol-water (5:8) mixed solvent and was reacted with 6.2 g of the lithium salt of TCNQ dissolved in 500 ml. of the same mixed solvent. The reaction was conducted under an atmosphere of nitrogen at 40°C. for 3 hours. After the reaction was completed, the system was allowed to stand for about 2 hours to assure the complete precipitation of the product. Next, the precipitate was separated by filtration, sufficiently washed with water and methanol and then sufficiently dried. An 11.5 g quantity of the product was obtained. Chemical analyses of the reaction product confirmed that halogen ions were almost completely exchanged with TCNQ radical anions and the desired product was obtained. A film was prepared of the product in the same manner as in Example 1 and electroconductivity measurements were conducted on the film. The specific resistivity relationship corresponding to the amounts of neutral TCNQ added are shown in Table III.

TABLE III

| Amount of neutral TCNQ added, neutral TCNQ/anion TCNQ (mole ratio) | $\rho$ (specific resistivity) $\Omega \cdot cm$ |
|---|---|
| 0 | $2.7 \times 10^3$ |
| 0.1 | $1.2 \times 10^3$ |
| 0.2 | $1.7 \times 10^2$ |
| 0.3 | $1.2 \times 10^3$ |
| 0.4 | $1.4 \times 10^3$ |

The film of this example showed a very low resistance value which was stable up to 1 MHz. The low resistivity obtained indicated that the material could be used without the addition of neutral TCNQ. If neutral TCNQ was employed with the material, the resistance value of the product was lowest when the ratio of neutral TCNQ to anion TCNQ was 0.2. The energy of activation for this material was 0.25 eV. This material was thermally resistant up to 200°C. and, even if allowed to stand at 80°C. for 200 hours, its electrical properties remained unchanged and its stability was excellent. Various studies confirmed that the material had a very large dielectric constant. This material exhibited a high dielectric constant of 8,000 at a measured frequency of 1 KHz.

EXAMPLE 4

A 3.2 g quantity of the polycationic polymer produced by the nitrogen quarternarization of an $\alpha,\omega$-dimorpholino propane and p-xylylene chloride was dissolved in a mixed solvent of methanol-water (3:1), and was reacted with 4.2 g of the lithium salt of TCNQ dissolved in the same mixed solvent. The reaction was conducted under an atmosphere of nitrogen at 40°C. for 3 hours. After the reaction, the product was separated by filtration, sufficiently washed with water and methanol, and then sufficiently dried. A 5.6 g quantity of a dark blue reaction product was obtained.

Electroconductivity measurements of a film prepared from the product by the same method as set forth in Example 1, revealed a value of $2.1 \times 10^2$ $\Omega$.cm as the lowest volume, solid inherent resistance value. When an electric current was applied to the film for a sufficient period of time, variations in the electroconductivity were not immediately recognized. Thus, this kind of film has not been confirmed to be very high in reliability.

Although, in Examples 2 and 4, propylene linking units were employed, in general, any methylene chain having 2 to 18 carbon atoms gives a product of similar properties. If the number of carbon atoms employed is more than 18, the distance between neighboring radical anions increases resulting in a high potential barrier to electron flow. Therefore, the electric conductivity decreases.

The above Examples disclose only the use of piperidine and morpholine derivatives as the cyclic amines. However, other heterocyclic amines containing sulfur such as thiomorpholine can also be used. Other cyclic amines containing more or less than 6 carbon atoms in the ring such as pyrrolidine can be used. Polycationic polymers or one having amine containing different cyclic amines in the same principal chain can also be used.

The polyion complexes of the present invention can be employed in many ways. For example, they can be dissolved in an appropriate solvent to be coated on a part of an electronic instrument such as a print base plate of an electronic circuit, an electronic part of a semiconductor element, etc. for use instead of a metal or solder and, in addition, is widely applicable for uses such as coating agents for exothermic bodies, photoelectric bodies or for forming electrical conductive films.

Having now fully described the invention, it will be apparent to one of ordinary skill in the art that many changes and modifications can be made thereto without departing from the spirit or scope of the invention as set forth herein.

What is claimed and desired to be secured by Letters Patent is:

1. An electroconductive film forming high polymer composition which comprises a salt of an integral type of polycationic polymer containing in its principal repeating unit, a quarternarized nitrogen atom, which is a member of a saturated heterocyclic ring acting aas a side chain, and a linking unit as the cationic portion of said salt, an anion radical of a tetracyano compound as the anionic portion of said salt, and a neutral tetracyano compound in an amount sufficient to impart an electroconductivity of more than $10^{-7}$ $\Omega cm^{-1}$ to said salt.

2. The electroconductive high polymer composition as set forth in claim 1, wherein the principal chain of said polycationic polymer is an integral type represented by the formula:

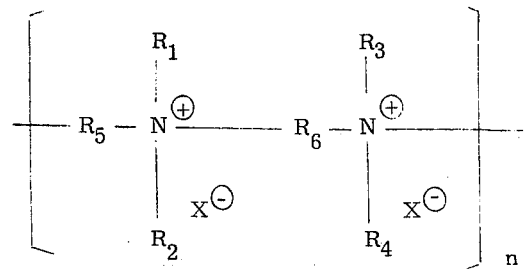

wherein $R_1$, $R_2$, $R_3$ and $R_4$ may be the same or different and each represents an alkyl group containing 1 to 4 carbon atoms; $R_5$ and $R_6$ are saturated or unsaturated alkylene, aryl alkylene or xylylene groups; $X^-$ is a counter ion to the ammonium groups.

3. The electroconductive high polymer composition as set forth in claim 2, wherein said principal chain has the formula:

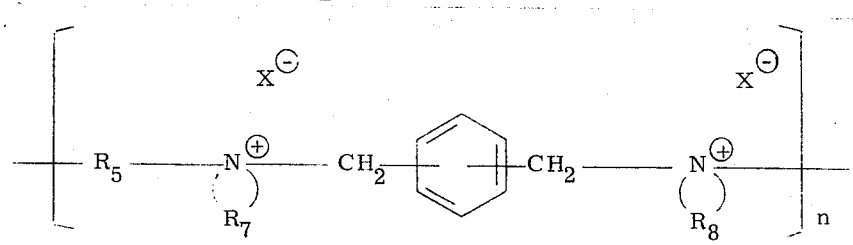

wherein $R_5$ is a saturated or unsaturated alkylene, aryl alkylene or xylylene group; $R_7$ and $R_8$ are saturated alkylene groups having 3 to 30 carbon atoms with at least one oxygen or sulfur atom in addition to said carbon atoms; $X^-$ is a counter ion to the ammonium groups.

4. The electroconductive high polymer composition as set forth in claim 1, wherein said radical anion is the 7,7',8,8'-tetracyanoquinodimethane radical anion.

5. An electroconductive high polymer composition as set forth in claim 2, wherein said radical anion is the 7,7',8,8'-tetracyanoquinodimethane radical anion.

6. A process for preparing an electroconductive film forming high polymer composition which comprises reacting an integral type of polycationic polymer containing in its principal repeating unit, a quarternarized nitrogen atom, which is a member of a saturated heterocyclic ring acting as a side chain, and a linking unit with a metallic salt or an organic cation salt of a tetracyano radical anion in a liquid phase under an atmosphere of nitrogen to prepare a salt of a polycationic polymer and a tetracyano radical anion and adding thereafter a neutral compound to a solution of said salt.

7. The process of claim 6, wherein the principal chain of said polycationic polymer is an integral type represented by the formula:

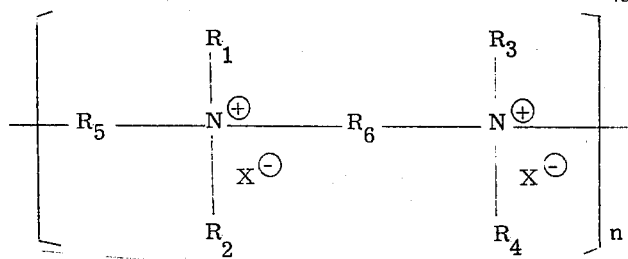

wherein $R_1, R_2, R_3$ and $R_4$ may be the same or different, and each represents an alkyl group containing 1 to 4 carbon atoms; $R_5$ and $R_6$ are saturated or unsaturated alkylene, aryl alkylene or xylylene groups; $X^-$ is a counter ion to the ammonium groups.

8. The process of claim 6, wherein the principal chain of said polycationic polymer is an integral type represented by the formula:

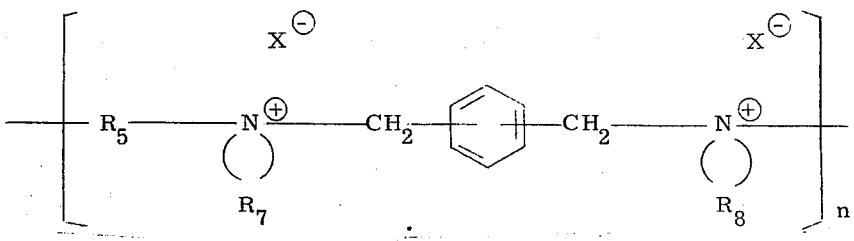

wherein $R_5$ is a saturated or unsaturated alkylene, aryl alkylene or xylylene group; $R_7$ and $R_8$ are saturated alkylene groups having 3 to 60 carbon atoms with at least one oxygen or sulfur atom in addition to said carbon atoms; $X^-$ is a counter ion to the ammonium groups.

9. The process of claim 6, wherein said tetracyano radical anion is the 7,7',8,8'-tetracyanoquinodimethane radical anion.

10. The process of claim 6, wherein said metallic salt of said tetracyano radical anion is the lithium salt of TCNQ.

11. The process of claim 6, wherein the lithium salt of TCNQ is used in an amount in excess of the stoichiometric amount of halide ion in said polycationic polymer by a factor of 1 to 2 and wherein the reaction temperature is 0° to 50°C., and the reaction time is 30 minutes to 5 hours.

* * * * *